US010862141B2

(12) United States Patent
Hickey et al.

(10) Patent No.: US 10,862,141 B2
(45) Date of Patent: Dec. 8, 2020

(54) MULTI-STACK FUEL CELL SYSTEMS AND HEAT EXCHANGER ASSEMBLIES

(71) Applicant: CUMMINS ENTERPRISE LLC, Indianapolis, IN (US)

(72) Inventors: Darren Bawden Hickey, Halfmoon, NY (US); Keith Brown, Clifton Park, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 0 days.

(21) Appl. No.: 15/234,865

(22) Filed: Aug. 11, 2016

(65) Prior Publication Data

US 2018/0048002 A1 Feb. 15, 2018

(51) Int. Cl.
| | | |
|---|---|---|
| *H01M 8/04014* | (2016.01) | |
| *H01M 8/04007* | (2016.01) | |
| *H01M 8/2404* | (2016.01) | |
| *H01M 8/02* | (2016.01) | |
| *H01M 8/248* | (2016.01) | |

(Continued)

(52) U.S. Cl.
CPC ......... *H01M 8/04014* (2013.01); *H01M 8/02* (2013.01); *H01M 8/04007* (2013.01); *H01M 8/2404* (2016.02); *H01M 8/248* (2013.01); *H01M 8/249* (2013.01); *H01M 8/004* (2013.01)

(58) Field of Classification Search
CPC ........... H01M 8/04014; H01M 8/2404; H01M 8/004; H01M 8/02; H01M 8/248; H01M 8/249
See application file for complete search history.

(56) References Cited

U.S. PATENT DOCUMENTS 4,490,445 A 12/1984 Hsu
7,740,966 B2 6/2010 Jacobson et al.
(Continued)

FOREIGN PATENT DOCUMENTS

EP 2 355 204 B1 10/2012
JP 2007-329121 A 12/2007
(Continued)

OTHER PUBLICATIONS

Wolak, Fuel Cell Power Plants Renewable and Waste Fuels, Fuel Cell Energy, Jan. 31, 2011, pp. 1-23, DOE-DOD Workshop Washington, DC.
(Continued)

*Primary Examiner* — Victoria H Lynch
(74) *Attorney, Agent, or Firm* — Barnes & Thornburg LLP

(57) ABSTRACT

A multi-stack fuel cell system includes upper and lower housings defining interior chambers in corresponding upper and lower stacks of fuel cells are disposed. A heat exchanger assembly is fluidly coupled with the interior chambers. The heat exchanger assembly receives input fuel and/or input air from outside of the housings and receives outgoing fuel and/or outgoing air from the fuel cells. The heat exchanger assembly heats the input fuel and/or the input air, and/or cools the outgoing fuel and/or the outgoing air. The heat exchanger assembly may be disposed between the upper and lower housings. The upper housing an upper stack of fuel cells and/or the heat exchanger assembly may assist in compressing the fuel cells in the lower stack against each other.

7 Claims, 8 Drawing Sheets

(51) Int. Cl.
*H01M 8/249* (2016.01)
*H01M 8/00* (2016.01)

(56) References Cited

U.S. PATENT DOCUMENTS

| | | | |
|---|---|---|---|
| 8,057,946 B2 | 11/2011 | Whitehead et al. | |
| 2004/0081872 A1* | 4/2004 | Herman | H01M 8/04014 |
| | | | 429/413 |
| 2007/0287045 A1 | 12/2007 | Lee et al. | |
| 2013/0059221 A1 | 3/2013 | Katano | |
| 2014/0295308 A1 | 10/2014 | Tsuga et al. | |

FOREIGN PATENT DOCUMENTS

| | | |
|---|---|---|
| JP | 2002-208427 A | 10/2009 |
| JP | 2011-522375 A | 7/2011 |
| JP | 6093452 | 3/2017 |
| WO | 95/23436 A1 | 8/1995 |
| WO | 2009/148505 A2 | 12/2009 |
| WO | 2011/150458 A1 | 12/2011 |
| WO | 2014/177207 A1 | 11/2014 |
| WO | 2015/087913 A1 | 6/2015 |

OTHER PUBLICATIONS

Jenbacher gas engines Technical Specification, Jun. 30, 2016, pp. 1-4.

Odabaee, M. et al., "Metal foam heat exchangers for thermal management of fuel cell systems—An experimental study," Experimental Thermal and Fluid Science, vol. 51, pp. 214-219 (Nov. 2013).

Partial European Search Report and Opinion issued in connection with corresponding EP Application No. 17184449.1 dated Nov. 14, 2017.

Extended European Search Report and Opinion issued in connection with corresponding EP Application No. 17184449.1 dated Apr. 16, 2018.

* cited by examiner

608

MULTI-STACK FUEL CELL SYSTEMS AND HEAT EXCHANGER ASSEMBLIES

FIELD

The subject matter described herein generally relates to fuel cell systems, and more particularly to solid-oxide fuel cell (SOFC) systems.

BACKGROUND

Fuel cells are electrochemical energy conversion devices that have demonstrated a potential for relatively high efficiency and low pollution in power generation. A fuel cell generally provides a direct current (dc) which may be converted to alternating current (ac) via, for example, an inverter. The dc or ac voltage can be used to power motors, lights, communication equipment and any number of electrical devices and systems. Fuel cells may operate in stationary, semi-stationary, or portable applications. Certain fuel cells, such as SOFCs, may operate in large-scale power systems that provide electricity to satisfy industrial and municipal needs. Others may be useful for smaller portable applications such as, for example, powering cars.

A fuel cell produces electricity by electrochemically combining a fuel and an oxidant across an ionic conducting layer. This ionic conducting layer, also labeled the electrolyte of the fuel cell, may be a liquid or solid. Common types of fuel cells include phosphoric acid (PAFC), molten carbonate (MCFC), proton exchange membrane (PEMFC), and solid oxide (SOFC), all generally named after their electrolytes. In practice, fuel cells are typically amassed in electrical series in an assembly of fuel cells to produce power at useful voltages or currents.

In general, components of a fuel cell include the electrolyte and two electrodes. The reactions that produce electricity generally take place at the electrodes where a catalyst is typically disposed to speed the reactions. The electrodes may be constructed as channels, porous layers, and the like, to increase the surface area for the chemical reactions to occur. The electrolyte carries electrically charged particles from one electrode to the other and is otherwise substantially impermeable to both fuel and oxidant.

Typically, the fuel cell converts hydrogen (fuel) and oxygen (oxidant) into water (byproduct) to produce electricity. The byproduct water may exit the fuel cell as steam in high-temperature operations. This discharged steam (and other hot exhaust components) may be utilized in turbines and other applications to generate additional electricity or power, providing increased efficiency of power generation. If air is employed as the oxidant, the nitrogen in the air is substantially inert and typically passes through the fuel cell. Hydrogen fuel may be provided via local reforming (e.g., on-site steam reforming) or remote reforming of carbon-based feedstocks, such as reforming of the more readily available natural gas and other hydrocarbon fuels and feedstocks. Examples of hydrocarbon fuels include, but are not limited to, natural gas, methane, ethane, propane, methanol, and other hydrocarbons.

Some fuel cell systems include multiple fuel cells connected in series with each other by vertically stacking the fuel cells on top of each other. The fuel cells may need to be tightly held together to prevent cracks or other flow paths for fuel or air between the fuel cells. These cracks or flow paths can lead to degradation and failure of the entire stack of fuel cells.

The efficiency of combined cycle fuel cell systems in converting hydrocarbon fuel into electrical energy is limited by loss mechanisms within the system that lose heat during transfer of fuel and/or air from sources of the fuel and air into the fuel cells. Typically, these sources are disposed far from the fuel cells, resulting in a longer transport path for the fuel and/or air. Because the fuel and air is heated for the reaction in the fuel cells, the conduits used to transfer the fuel and air may be expensive due to the insulating materials and designs of the conduits to reduce the heat loss in the fuel and air during transport to the fuel cells.

BRIEF DESCRIPTION

In one embodiment, a multi-stack fuel cell system includes an upper housing defining an upper interior chamber in which an upper stack of fuel cells is disposed and a lower housing defining a lower interior chamber in which a lower stack of fuel cells is disposed. The upper housing is disposed above the lower housing such that weight of the upper housing and the upper stack of fuel cells compresses the fuel cells in the lower stack inside the lower housing.

In one embodiment, a multi-stack fuel cell system includes one or more housings defining one or more interior chambers in which one or more stacks of fuel cells are disposed, and a heat exchanger assembly fluidly coupled with the one or more interior chambers of the one or more housings. The heat exchanger assembly is configured to receive one or more of input fuel or input air from outside of the one or more housings and to receive one or more of outgoing fuel or outgoing air from the fuel cells in the one or more housings. The heat exchanger assembly is configured to one or more of heat the one or more of the input fuel or the input air or to cool the one or more of the outgoing fuel or the outgoing air.

In one embodiment, a method includes coupling a heat exchanger assembly with a lower housing having a lower stack of fuel cells disposed therein, and coupling an upper housing having an upper stack of fuel cells disposed therein with the heat exchanger assembly. The heat exchanger assembly is coupled with the lower and upper housing such that weight of the upper stack of the fuel cells in the upper housing compresses the fuel cells in the lower stack against each other.

BRIEF DESCRIPTION OF THE DRAWINGS

The present inventive subject matter will be better understood from reading the following description of non-limiting embodiments, with reference to the attached drawings, wherein below.

DETAILED DESCRIPTION

The inventive subject matter described herein provides multiple stack (or multi-stack) fuel cell systems having multiple stacks of SOFCs positioned on top of each other. In one embodiment, a top stack of fuel cells is placed above a bottom stack of fuel cells. The weight of the top stack can assist in compressing the fuel cells in the lower stack together. A heat exchanger assembly for both stacks of fuel cells may be positioned between the stacks. The heat exchanger can assist in heating the stacks, such as by receiving an input gas at a temperature of 600 degrees Celsius or less (or another temperature) and heating the gas to 800 degrees Celsius (or another temperature) for the stacks. As a result, the heat exchanger can receive relatively cool or low temperature fuel and air for the fuel cell stacks, heat the fuel and air, supply the fuel and air to the stacks, and receive and cool the byproduct effluent or exhaust from the stacks (e.g., by heating incoming fuel and air into the heat exchanger assembly) before directing the byproduct away from the stacks. Because the input fuel and air and the output byproduct from the heat exchanger assembly are relatively cool (e.g., no greater than 600 degrees Celsius), the conduits directing the fuel and air into the heat exchanger and receiving the byproduct output from the stacks via the heat exchanger can be made of less expensive and/or uninsulated material, such as stainless steel.

Figure 1:
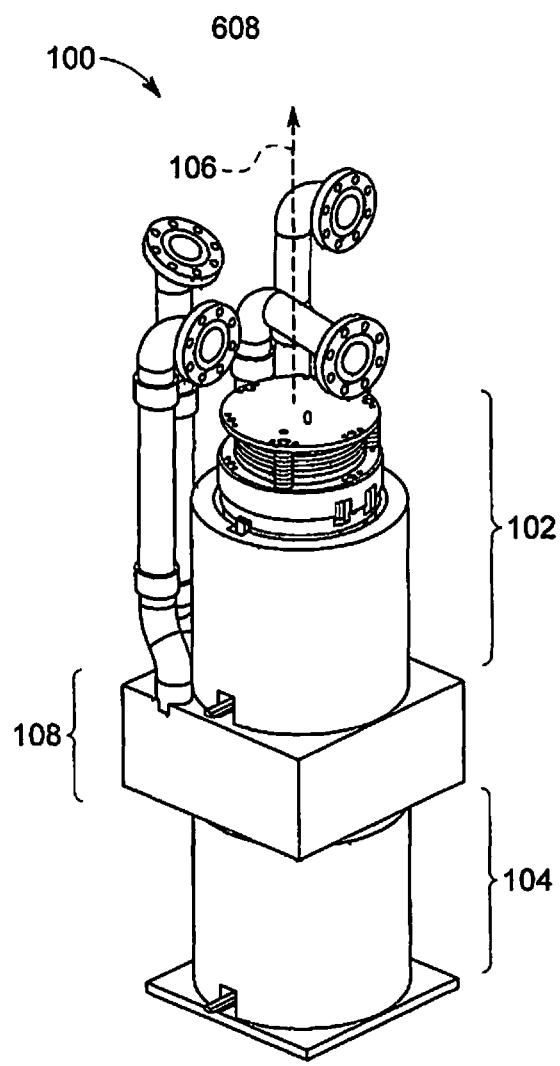
FIG. 1 illustrates one embodiment of a multi-stack fuel cell system.

FIG. 1 illustrates one embodiment of a multi-stack fuel cell system 100. The system 100 includes two stack assemblies 102, 104 of fuel cells, such as SOFCs, vertically stacked on top of each other along a vertical direction 106. The vertical direction 106 is generally oriented opposite to the direction of gravity. The fuel cells in each stack assembly 102, 104 are placed on top of each other along the vertical direction 106 such that the fuel cells are vertically stacked on top of each other. This results in the weight of the upper stack assembly 102 of fuel cells compressing the fuel cells in the lower stack assembly 104 together and assisting in keeping these fuel cells against each other. Fuel and air is directed into the stack assemblies 102, 104 for the fuel cells to generate electric current.

A heat exchanger assembly 108 is disposed between and fluidly coupled with the stack assemblies 102, 104 of fuel cells. As described below, the heat exchanger assembly 108 can use the heat from the byproduct of the fuel cells to heat the incoming fuel and incoming air (and also cool the outgoing byproduct of fuel and air). Alternatively, the heat exchanger assembly 108 can use the heat from the outgoing air from the fuel cells to heat the incoming fuel and incoming air and to cool the outgoing air, but not to cool the outgoing fuel, which may be used for reforming purposes.

Figure 2:
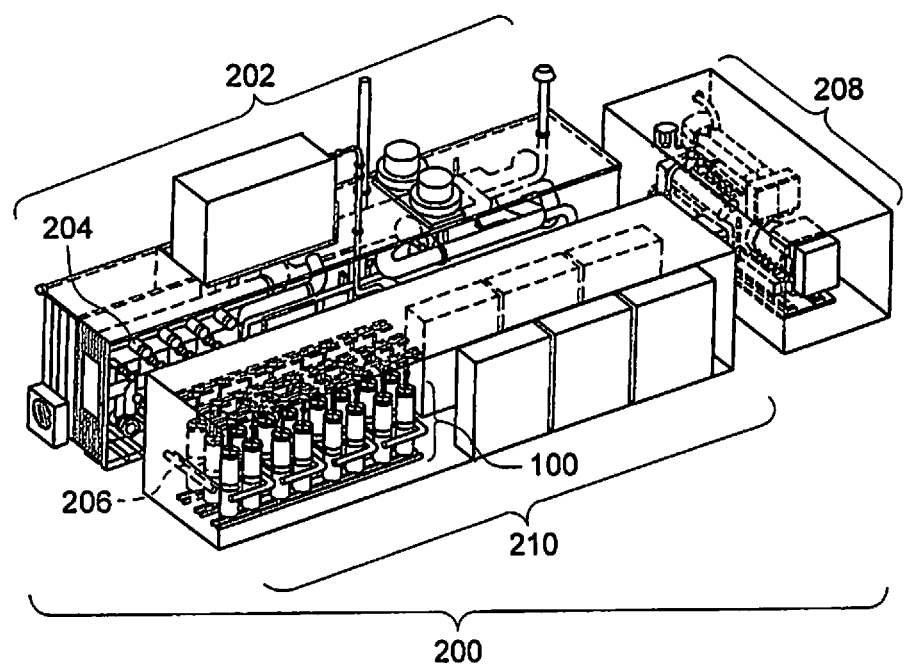
FIG. 2 illustrates one embodiment of a power generation plant that may include several multi-stack fuel cell systems shown in FIG. 1.

FIG. 2 illustrates one embodiment of a power generation plant 200 that may include several multi-stack fuel cell systems 100. The plant 200 includes a mechanical balance of plant (MBOP) 202 that operates as the sources of fuel and air for the fuel cell systems 100. The MBOP 202 can supply the fuel and air from various tanks or other containers via separate conduits 204 to the fuel cell systems 100. Although not shown in FIG. 2, the conduits 204 may be fluidly coupled with stack conduits 206 that are fluidly coupled with the heat exchanger assemblies 108 (shown in FIG. 1) of the fuel cell systems 100. The plant 200 optionally may include a natural gas engine 208 that operates using the same fuel as the fuel cell systems 100. The plant 200 also may include an electrical balance of plant (EBOP) 210, which represents electrical components that receive the DC generated by the fuel cell systems 100 and/or the engine 208. The EBOP 210 can include a control system that controls operation of the plant 200 (via circuitry, processors, input devices, etc.), inverters, and the like. The inverters of the EBOP 210 can convert the DC generated by the fuel cell systems 100 into AC. This AC may then be supplied to one or more loads (e.g., directly or via a utility grid).

As shown in FIG. 2, the plant 200 also may include several multi-stack fuel cell systems 100. These systems 100 are fluidly coupled with the MBOP 202 via the conduits 204, 206 to receive fuel and air from the MBOP 202 and to direct the byproduct fuel and air out of the systems 100 to the MBOP 202. In one embodiment, the fuel cell systems 100 may separately receive air and fuel from the MBOP 202 through the conduits 204, 206 at reduced temperatures of no greater than 600 degrees Celsius. This can allow for the conduits 204, 206 to be less insulated and formed from less expensive materials than if the conduits 204, 206 were required to deliver fuel and air at elevated temperatures in excess of 600 degrees Celsius to the fuel cell systems 100.

Figure 3:
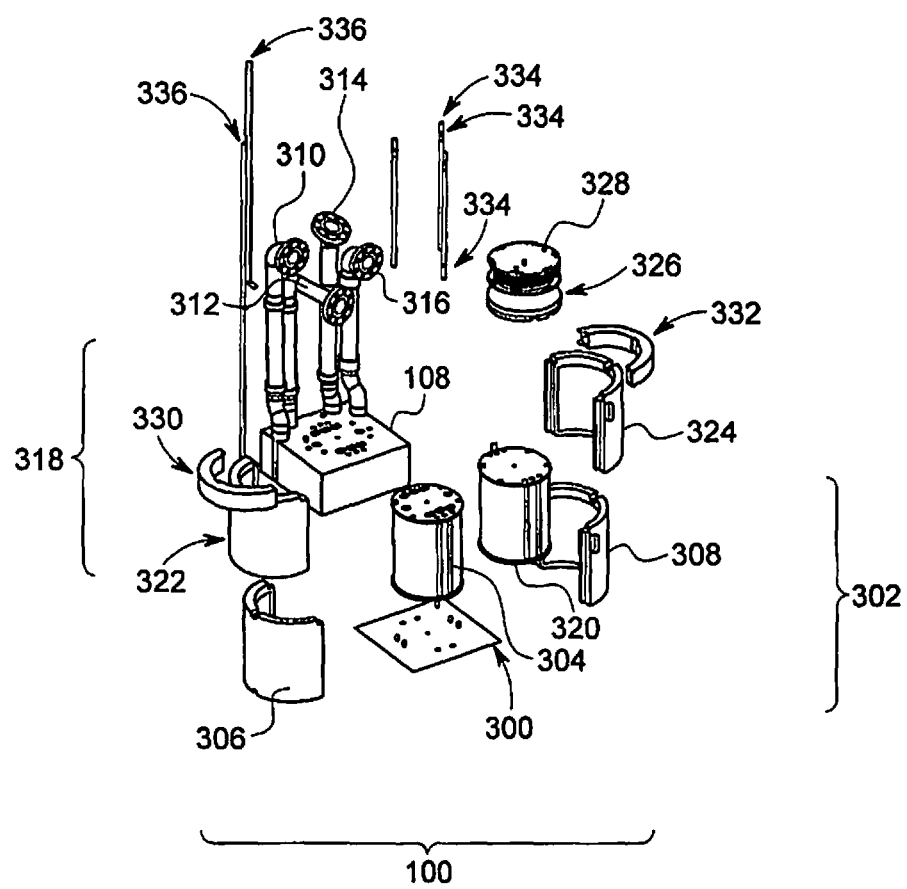
FIG. 3 illustrates an exploded view of the multi-stack fuel cell system shown in FIG. 1.

FIG. 3 illustrates an exploded view of the multi-stack fuel cell system 100 shown in FIG. 1. The lower stack assembly 104 (shown in FIG. 1) of the system 100 includes a lower support plate 300 on which a lower outer jacket housing 302 of the lower stack assembly 104 is disposed. The lower outer jacket housing 302 encloses or encircles a lower stack 304 of fuel cells. The lower outer jacket housing 302 is formed from opposing housing portions 306, 308 that mate with each other to form the portion of the lower outer jacket housing that encircles the lower stack 304 of fuel cells. The housing portions 306, 308 sit upon the lower support plate 300.

The heat exchanger assembly 108 is disposed on top of the lower outer jacket housing 302 with the lower stack 304 of fuel cells disposed between the heat exchanger assembly 108 and the lower support plate 300 along the vertical direction and between the housing portions 306, 308 of the lower outer jacket housing 302. The heat exchanger assembly 108 is fluidly coupled with an interior chamber inside the lower outer jacket housing 302 that also includes the lower stack 304 of fuel cells so that the heat exchanger assembly 108 can deliver air and fuel into the interior chamber of the lower outer jacket housing 302 and receive outgoing air and fuel from the lower stack 304 of the fuel cells.

Several stack conduits 310, 312, 314, 316 (also shown as 206 in FIG. 2) are fluidly coupled with the heat exchanger assembly 108 and with the conduits 204 (shown in FIG. 2). Different stack conduits 310, 312, 314, 316 deliver fuel into the heat exchanger assembly 108, deliver air into the heat exchanger assembly 108, receive outgoing fuel from the heat exchanger assembly 108, or receive outgoing air from the heat exchanger assembly 108.

An upper outer jacket housing 318 of the upper stack assembly 102 is disposed on the heat exchanger assembly 108. The upper outer jacket housing 318 encloses or encircles an upper stack 320 of fuel cells. The upper outer jacket housing 318 is formed from opposing housing portions 322, 324 that mate with each other to form the portion of the upper outer jacket housing 318 that encircles the upper stack 320 of fuel cells. The housing portions 322, 324 sit upon an upper surface of the heat exchanger assembly 108.

The upper outer jacket housing 318 also includes a dielectric end cap 326 that sits on the upper stack 320 of fuel cells. The dielectric end cap 326 may be formed from fused silica or another non-conductive material. A bellows cap 328 of the upper outer jacket housing 318 compresses the dielectric end cap 326 against an upper end or surface of the upper stack 320 of fuel cells. The bellows cap 328 can provide compressive forces on the fuel cells in the upper stack 320. The bellows cap 328 is encircled by semi-circular end members 330, 332 of the upper outer jacket housing 318 that also are coupled with the housing portions 322, 324 to enclose the upper stack 320 of fuel cells within an interior chamber of the upper outer jacket housing 318.

Each of the outer jacket housings 302, 318 define an interior chamber that is sealed from the outside environment. These interior chambers are sealed from the external environment except for the fuel and air supplied into the chambers for production of electric current by the fuel cells and except for the fuel and/or air that is not consumed by the fuel cells. The interior chambers may be defined by the jacket housing 302, 318, as well as another component, such as external surfaces of the heat exchanger assembly 108. For example, the interior chamber in which the lower stack 304 of fuel cells 402 is disposed may be defined or enclosed by the housing portions 306, 308, the lower plate 300 and a lower external surface of the heat exchanger assembly 108. The interior chamber in which the upper stack 320 of fuel cells 402 is disposed may be defined or enclosed by the housing portions 322, 324, the cap 326, optionally the end members 330, 332, optionally the bellows cap 328, and the upper external surface of the heat exchanger assembly 108. Alternatively, the heat exchanger assembly 108 may not be between the upper and lower stacks 102, 104 of the system 100. For example, the heat exchanger assembly 108 may be to one or more sides of the upper and/or lower stacks, may be below the lower stack, may be above the upper stack, etc. A plate, surface, or the like, of a component other than the heat exchanger assembly 108 may form one or more of the boundaries of the interior chamber of the upper or lower outer jacket housings 302, 318.

Several elongated pins or bars 334 may vertically extend through openings or holes in the fuel cells in the upper and/or lower stacks 320, 304 and be coupled with the bellows cap 328 on one end and the upper surface of the heat exchanger assembly 108 on the other end. These pins or bars 334 may have a length that causes the fuel cells in the upper stack 320 to be compressed against each other between the dielectric end cap 326 and the heat exchanger assembly 108. Longer elongated pins or bars 336 may be coupled with the upper outer jacket housing 318 on one end and the lower outer jacket housing 302 on the other end to secure the outer jacket housing 302, 318 with each other and/or to exert force on the outer jacket housings 302, 318 toward the heat exchanger assembly 108.

The fuel cells in the stacks 304, 320 are conductively coupled with each other such that the direct current generated by the fuel cells is conducted vertically through the stack 304 and vertically through the stack 320. These fuel cells also may be conductively coupled with the heat exchanger assembly 108, which includes or is formed from one or more conductive materials. The heat exchanger assembly 108 provides a conductive path for the direct current generated by the fuel cells to be conducted from the upper stack 320 down through the lower stack 304 and/or from the lower stack 304 up through the upper stack 320.

Figure 4:
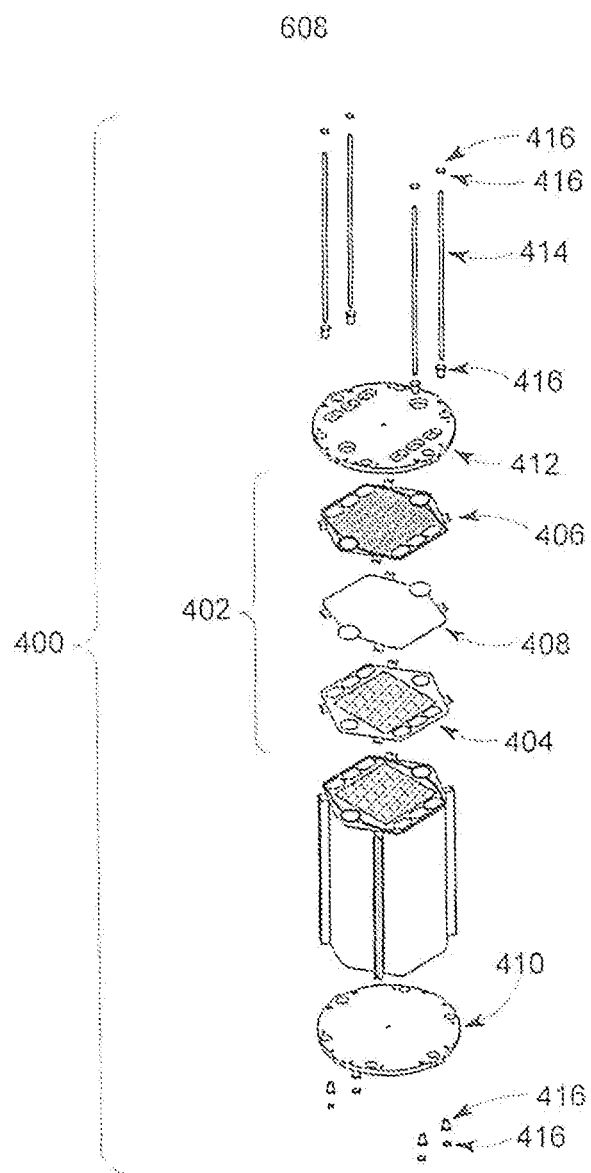
FIG. 4 illustrates an exploded view of a stack of fuel cells.

FIG. 4 illustrates an exploded view of a stack 400 of fuel cells 402. The stack 400 represents one or more of the stacks 304, 320 shown in FIG. 3. The stack 400 includes several fuel cells 402 vertically stacked on top of each other. The fuel cells 402 may be SOFCs or another type of fuel cell. The fuel cells 402 include multiple conductive plates 404, 406 and seals 408 that are coupled with each other to form a fuel cell 402, such as by brazing the plates 404, 406 and seal 408 together to form a fuel cell 402. The fuel cells 402 abut each other in the stack 400 so that the fuel cells 402 are conductively coupled with each other in a series in the stack 400. As described above, the fuel cells 402 in one stack 304 or 320 can be conductively coupled with the heat exchanger assembly 108 (shown in FIGS. 1 and 3), which also conductively couples the fuel cells 402 in the stack 304 or 320 with the fuel cells 402 in the other stack 320 or 304.

The fuel cells 402 are disposed by conductive end plates 410, 412 on opposite ends of the stacked fuel cells 402. These end plates 410, 412 are coupled with each other by elongated bars or pins 414 that are affixed to the end plates 410, 412 by fasteners 416, such as bolts, nuts, screws, etc. The length of the bars or pins 414 may be sufficiently short to cause the end plates 410, 412 to compress the fuel cells 402 against each other.

Figure 5:
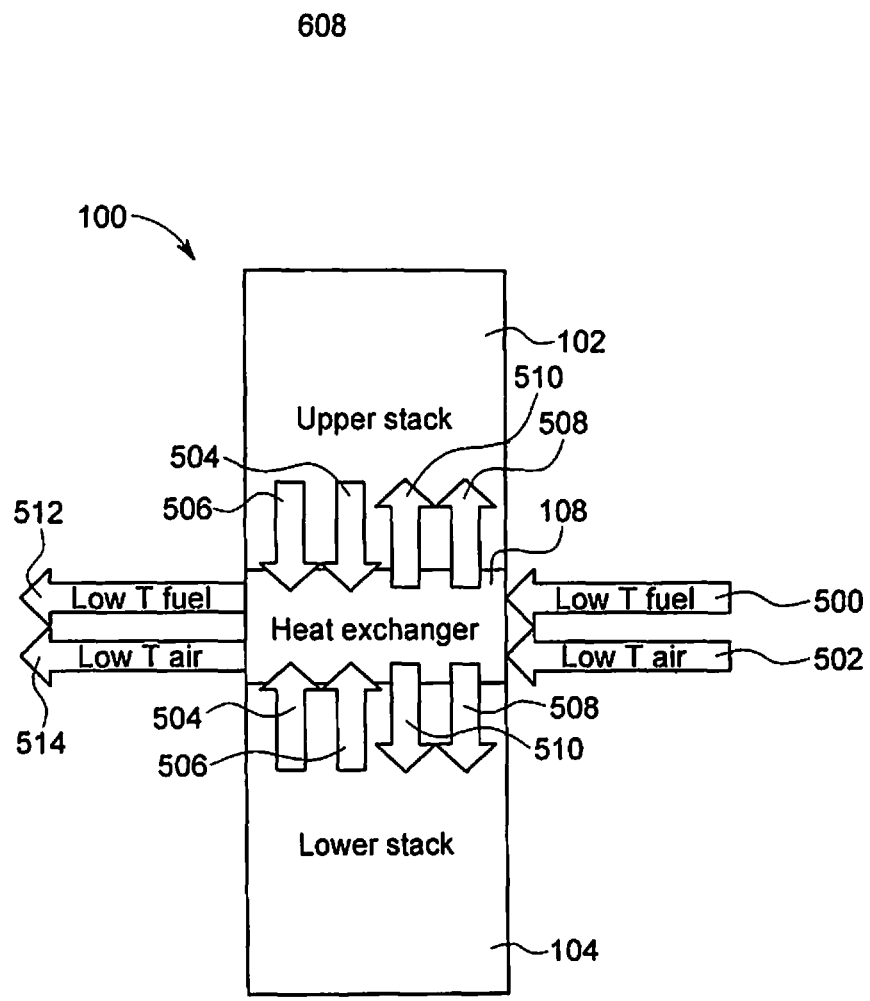
FIG. 5 schematically illustrates operation of the multi-stack fuel cell system shown in FIG. 1 according to one embodiment.

FIG. 5 schematically illustrates operation of the multi-stack fuel cell system 100 shown in FIG. 1 according to one embodiment. The heat exchanger assembly 108 receives exchanger-incoming fuel 500 and exchanger-incoming air 502 for use in generating electric current with the fuel cells 402 (shown in FIG. 4) in the upper and lower portions 102, 104 of the system 100. The exchanger-incoming fuel and air 500, 502 may be received via two or more separate conduits of the stack conduits 310, 312, 314, 316 (shown in FIG. 3) and the conduits 204 (shown in FIG. 2) from sources of the fuel and air 500, 502. The exchanger-incoming fuel and air 500, 502 may be low temperature fuel and air, such as fuel and air 500, 502 at a temperature of no greater than 600 degrees Celsius, no greater than 400 degrees Celsius, no greater than 200 degrees Celsius, no greater than 100 degrees Celsius, or no greater than the ambient temperature outside of the conduits 310, 312, 314, 316.

Supplying the exchanger-incoming fuel and air 500, 502 at lower temperatures can allow for less insulative (and, therefore, less expensive) materials to be used in the conduits 204, 206, 310, 312, 314, 316, can reduce the components needed to supply the exchanger-incoming fuel and air 500, 502 (e.g., by eliminating or reducing the need for components that heat the incoming fuel and air 500, 502 prior to entry into the heat exchanger assembly 108 or stack assemblies 102, 104), and/or can allow for the sources of the exchanger-incoming fuel and air 500, 502 to be located farther from the system 100.

The heat exchanger assembly 108 transfers thermal energy, or heat, to the exchanger-incoming fuel and air 500, 502 in order to increase the temperature of the fuel and/or air prior to delivery of the fuel and/or air to the fuel cells 402. The heat exchanger assembly 108 may transfer the heat from fuel cell-outgoing fuel and/or air 504, 506 that is received by the heat exchanger assembly 108 from the stacks 304, 320, 400 (shown in FIGS. 3 and 4) of fuel cells 402. In one embodiment, both the cooled exchanger-incoming fuel 500 and the cooled exchanger-incoming air 502 are heated by the heated fuel cell-outgoing fuel 504 and the heated fuel cell-outgoing air 506. Alternatively, only one of the cooled exchanger-incoming fuel 500 or the cooled exchanger-incoming air 502, but not both, is heated by the heated fuel cell-outgoing fuel 504 and the heated fuel cell-outgoing air 506. Alternatively, one or both of the cooled exchanger-incoming fuel 500 and/or the cooled in exchanger-incoming put air 502 is heated by only one of the heated fuel-cell-outgoing fuel 504 or the heated fuel cell-outgoing air 506.

The heat exchanger assembly 108 may heat the exchanger-incoming fuel 500 and/or the exchanger-incoming air 502 to at least a designated temperature, such as a temperature greater than 600 degrees Celsius (but lower than upper temperature limits of the material(s) from which components of the system 100 are made). The designated temperature may be a temperature that the conduits 204, 206 can safely transfer (e.g., without melting, scorching, or otherwise damaging the conduits). The designated temperature alternatively may be the temperature at which the fuel and/or air is to be at for the fuel cells to convert the fuel and air into electric current.

The heat exchanger assembly 108 may heat the exchanger-incoming fuel 500 and/or the exchanger-incoming air 502 using thermal energy from the fuel cell-outgoing fuel 504 and/or fuel cell-outgoing air 506, or may augment the heating of the exchanger-incoming fuel 500 and/or exchanger-incoming air 502 using additional sources of heat (e.g., resistive elements that are heated by conducting current). In one embodiment, the outer jacket housings 306, 308, 322, 324 of the system 100 shown in FIG. 3 may heat the fuel and air in the system 100 or at least maintain the temperature of the fuel and/or air in the system 100.

The exchanger-incoming fuel 500 and exchanger-incoming air 502 that is heated is directed by the heat exchanger assembly 108 into the upper and lower stack assemblies 102, 104 of the system 100 as heated fuel cell-input fuel 508 and heated fuel-cell input air 510. The fuel cells 402 in the upper and lower stack assemblies 102, 104 consume at least some of this heated fuel cell-input fuel and air 508, 510 to generate electric current. At least some of the heated fuel cell-input fuel 508 and/or the heated fuel cell-input air 510 that is not consumed during this process flows from the upper and lower stack assemblies 102, 104 and into the heat exchanger assembly 108 as the heated fuel cell-outgoing fuel 504 and the heated fuel cell-outgoing air 506.

During the exchange of thermal energy from the heated fuel cell-outgoing fuel 504 and/or the heated fuel cell-outgoing air 506 to the cooled input fuel 500 and/or the cooled input air 502, the heated outgoing fuel 504 and/or the heated outgoing air 506 may be cooled. For example, the heated outgoing fuel 504 and/or the heated outgoing air 506 may be cooled to temperatures that do not exceed 600 degrees Celsius, do not exceed 400 degrees Celsius, do not exceed 200 degrees Celsius, do not exceed 100 degrees Celsius, or do not exceed the ambient temperature outside of the conduits 310, 312, 314, 316. The outgoing fuel 504 and the outgoing air 506 that is cooled by the heat exchanger assembly 108 may be referred to as cooled outgoing fuel 512 and cooled outgoing air 514. The cooled outgoing fuel and air 512, 514 may flow away from the heat exchanger assembly 108 via one or more of the conduits 204, 206, 310, 312, 314, 316. Cooling the outgoing fuel and air 512, 514 can allow for less insulative (and, therefore, less expensive) materials to be used in the conduits 204, 206, 310, 312, 314, 316 and/or reduces the components needed to receive the fuel and air 512, 514 (e.g., by eliminating or reducing the need for components that cool the outgoing fuel and air).

As shown in FIG. 5, all of the fuel and/or air that is input into the heat exchanger assembly 108 and that is output from the heat exchanger assembly 108 is cooled fuel 500, 512 and cooled air 502, 514. As described above, this can reduce the cost and complexity of the conduits and other components that handle the fuel 500, 512 and air 502, 514 outside of the heat exchanger assembly 108.

Figure 6:
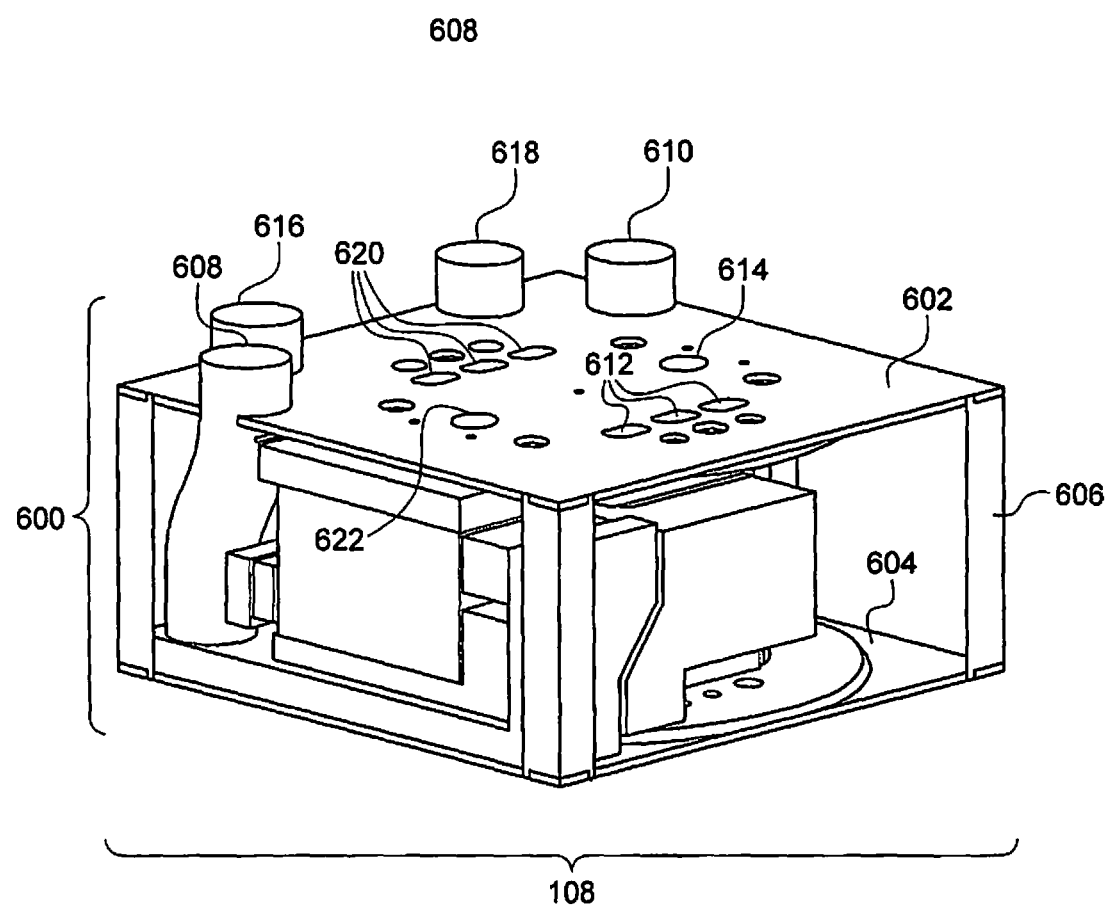
FIG. 6 illustrates a perspective view of one embodiment of a heat exchanger assembly shown in FIG. 1.

FIG. 6 illustrates a perspective view of one embodiment of the heat exchanger assembly 108 shown in FIG. 1. The heat exchanger assembly 108 includes an outer housing 600 formed from an upper plate 602 and an opposite lower plate 604 that are joined by plural vertical bodies or bars 606. The upper plate 602 may engage or otherwise be conductively coupled with the fuel cells 402 (shown in FIG. 4) in the upper stack assembly 102 (shown in FIG. 1) and the lower plate 604 may engage or otherwise be conductively coupled with the fuel cells 402 in the lower stack assembly 104 (shown in FIG. 1). The housing 600 may be formed from one or more conductive materials so that the fuel cells 402 in the upper stack assembly 102 are conductively coupled with the fuel cells 402 in the lower stack assembly 104 by the housing 600.

The heat exchanger assembly 108 includes several inlet conduits 608, 610, 612, 614 and outlet conduits 616, 618, 620, 622. These conduits 608, 610, 612, 614, 616, 618, 620, 622 include openings on opposite sides of the heat exchanger assembly 108 so that the conduits may be fluidly coupled with the interior of the upper stack assembly 102 in locations on or above the upper plate 602 of the heat exchanger assembly 108 and fluidly coupled with the interior of the lower stack assembly 104 in locations on or below the lower plate 604 of the heat exchanger assembly 108.

Figure 7:
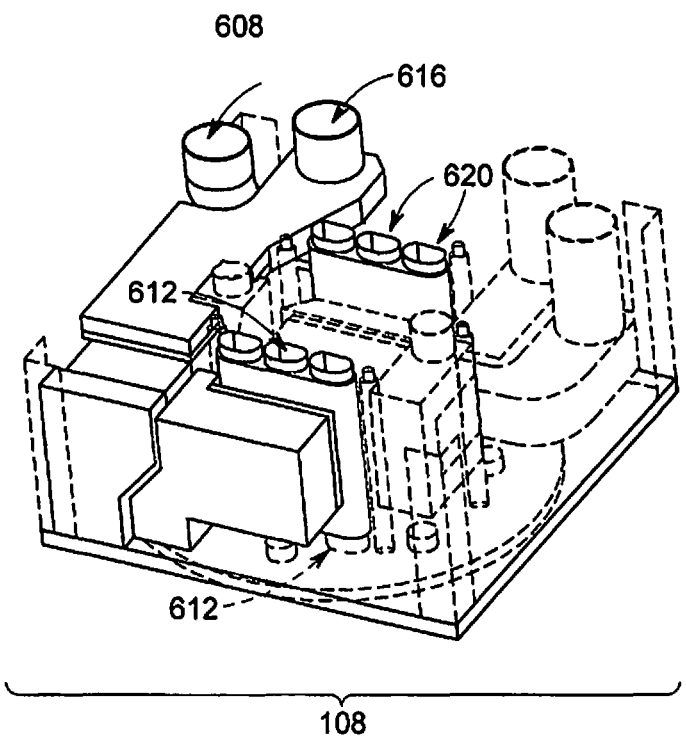
FIG. 7 illustrates air handling components of the heat exchanger assembly shown in FIG. 1 according to one embodiment.
Figure 8:
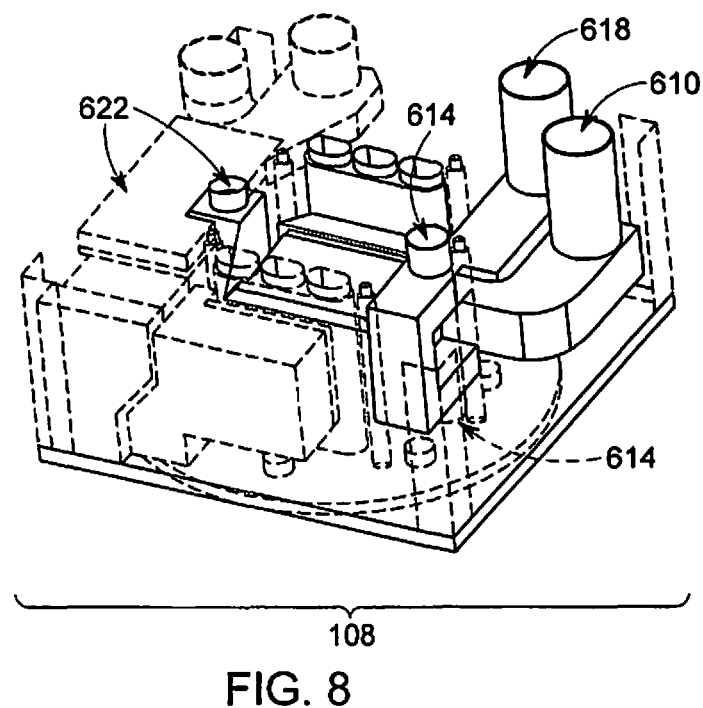
FIG. 8 illustrates fuel handling components of the heat exchanger assembly shown in FIG. 1 according to one embodiment.

With continued reference to the heat exchanger assembly 108 shown in FIG. 6, FIG. 7 illustrates air handling components of the heat exchanger assembly 108 according to one embodiment and FIG. 8 illustrates fuel handling components of the heat exchanger assembly 108 according to one embodiment. The conduits of the heat exchanger assembly 108 through which the air 502, 506, 510, 514 (shown in FIG. 5) flows are separate from and not fluidly coupled with the conduits of the heat exchanger assembly 108 through which the fuel 500, 504, 508, 512 (shown in FIG. 5) flows. These conduits include openings on opposite sides of the heat exchanger assembly 108 so that both the upper and lower stack assemblies 102, 104 are fluidly coupled with the conduits.

With respect to the air handling components of the heat exchanger assembly 108 shown in FIG. 7, the inlet conduit 608 may be referred to as a cooled air inlet through which the heat exchanger assembly 108 receives the cooled input air 502 (shown in FIG. 5) from outside of the multi-stack fuel cell system 100 (shown in FIG. 1). The inlet conduit 612 may be referred to as a heated air inlet through which the heat exchanger assembly 108 receives the heated outgoing air 506 from the upper or lower stack assembly 102, 104. The outlet conduit 620 may be referred to as a heated air outlet through which the heat exchanger assembly 108 supplies the heated input air 510 (shown in FIG. 5) to the upper or lower stack assembly 102, 104. The outlet conduit 616 may be referred to as a cooled air outlet through which the heat exchanger assembly 108 supplies the cooled outgoing air 514 to one or more locations outside of the system 100.

With respect to the fuel handling components of the heat exchanger assembly 108 shown in FIG. 8, the inlet conduit 610 may be referred to as a cooled fuel inlet through which the heat exchanger assembly 108 receives the cooled input fuel 500 (shown in FIG. 5) from outside of the system 100. The inlet conduit 614 may be referred to as a heated fuel inlet through which the heat exchanger assembly 108 receives the heated outgoing fuel 504 from the upper or lower stack assembly 102, 104. The outlet conduit 622 may be referred to as a heated fuel outlet through which the heat exchanger assembly 108 supplies the heated input fuel 508

(shown in FIG. 5) to the upper or lower stack assembly 102, 104. The outlet conduit 618 may be referred to as a cooled fuel outlet through which the heat exchanger assembly 108 supplies the cooled outgoing fuel 512 to one or more locations outside of the system 100.

The heat exchanger assembly 108 operates by directing the fuel and air through separate conduits 608, 610, 612, 614, 616, 618, 620, 622 in the assembly 108 to cause the outgoing heated fuel and/or air to increase the temperature of the input cooled fuel and/or air (and thereby cool the heated fuel and/or air), as described above. The conduit 610 receives cooled fuel 500 into the heat exchanger assembly 108 from outside the heat exchanger assembly 108 and the conduit 614 receives heated fuel 504 into the heat exchanger assembly 108 from the upper and/or lower stack assemblies 102, 104. The conduits 610, 614 direct the fuels in thermal proximity (e.g., sufficiently close to heated fuel and/or heated air to increase the temperature of the fuel 500) with each other to cause the cool fuel 500 from outside the system 100 to be heated by the heated fuel 504 from the fuel cells 402 (and cool the heated fuel 504), but without mixing the fuels 500, 504 with each other. The conduit 610 that received the cooled fuel 500 is fluidly coupled with the conduit 622 so that the cooled fuel 500 that is heated into the heated fuel 508 is directed into the fuel cells 402 in one or more of the stack assemblies 102, 104. The conduit 614 that received the heated fuel 504 from the fuel cells 402 in one or more of the stack assemblies 102, 104 is fluidly coupled with the conduit 618 so that the heated fuel 504 that is cooled to the cooled fuel 512 is directed out of the heat exchanger assembly 108 and the system 100 via the conduit 618.

The conduit 608 receives cooled air 502 into the heat exchanger assembly 108 from outside the heat exchanger assembly 108 and the conduit 612 receives heated air 506 into the heat exchanger assembly 108 from the upper and/or lower stack assemblies 102, 104. The conduits 608, 612 direct these cooled and heated airs in thermal proximity with each other to cause the cool air 502 from outside the system 100 to be heated by the heated air 506 from the fuel cells 402 (and cool the heated air 506), but without mixing the airs 502, 506 with each other. The conduit 608 that received the cooled air 502 is fluidly coupled with the conduit 620 so that the cooled air 502 that is heated into the heated air 510 is directed into the fuel cells 402 in one or more of the stack assemblies 102, 104. The conduit 612 that received the heated air 506 from the fuel cells 402 in one or more of the stack assemblies 102, 104 is fluidly coupled with the conduit 616 so that the heated air 506 that is cooled to the cooled air 514 is directed out of the heat exchanger assembly 108 and the system 100 via the conduit 616.

Figure 9:
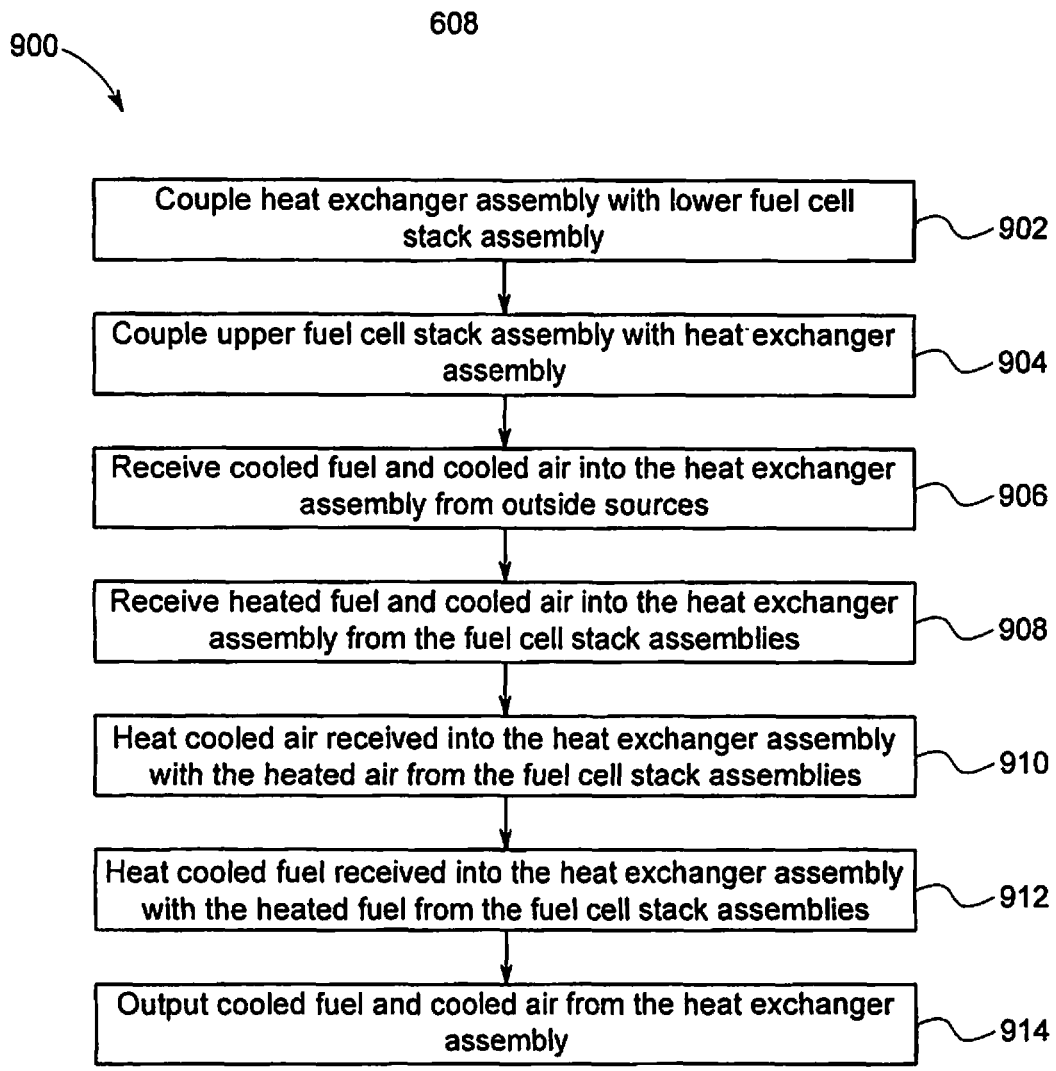
FIG. 9 illustrates a flowchart of one embodiment of a method for providing and operating a multi-stack fuel cell system.

FIG. 9 illustrates a flowchart of one embodiment of a method 900 for providing and operating a multi-stack fuel cell system. The method 900 may be used to assemble and/or operate the fuel cell system 100 shown in FIG. 1. In one embodiment, part of the method 900 may be used to assemble the system 100 and another part of the method 900 may be used to operate the system 100. Not all embodiments of the method 900 are limited to both assembling and operating the system 100.

At 902, a heat exchanger assembly is coupled with a lower fuel cell stack assembly. The heat exchanger assembly 108 (shown in FIG. 1) may be conductively coupled with the lower stack assembly 104 (shown in FIG. 1) by mounting the heat exchanger assembly 108 or otherwise contacting the heat exchanger assembly 108 with the lower stack assembly 104.

At 904, the heat exchanger assembly is coupled with an upper fuel cell stack assembly. The heat exchanger assembly 108 may be conductively coupled with the upper stack assembly 102 (shown in FIG. 1) by mounting the upper stack assembly 102 onto the heat exchanger assembly 108. The weight of the upper stack assembly and the heat exchanger assembly can assist in compressing the fuel cells in the lower stack assembly against each other to prevent seals between neighboring or adjacent fuel cells from being broken or interrupted.

At 906, cooled fuel and cooled air are received into the heat exchanger assembly from outside sources. The fuel and air may not be heated above a designated temperature, as described above. At 908, heated fuel and heated air are received into the heat exchanger assembly from one or more of the fuel cell stack assemblies. At 910 and 912, the heated fuel and/or heated air is directed through the heat exchanger assembly in close proximity to the cooled fuel and/or cooled air so that the cooled fuel and/or cooled air is heated and the heated fuel and/or heated air is cooled. The fuel and air that is heated in the heat exchanger can be directed into the fuel cells of the stack assemblies for use by the fuel cells in generating electric current. At 914, the fuel and/or air that is cooled in the heat exchanger assembly is directed out of the heat exchanger assembly.

In one embodiment, a multi-stack fuel cell system includes an upper housing defining an upper interior chamber in which an upper stack of fuel cells is disposed and a lower housing defining a lower interior chamber in which a lower stack of fuel cells is disposed. The upper housing is disposed above the lower housing such that weight of the upper housing and the upper stack of fuel cells compresses the fuel cells in the lower stack inside the lower housing.

Optionally, the upper interior chamber is defined by the upper housing is separate from the lower interior chamber of the lower housing.

The system can include a heat exchanger assembly disposed between the upper housing and the lower housing. The heat exchanger assembly can be configured to alter a temperature of one or more of input fuel supplied to the fuel cells in the upper stack and the fuel cells in the lower stack, input air supplied to the fuel cells in the upper stack and the fuel cells in the lower stack, outgoing fuel received from the fuel cells in the upper stack and the fuel cells in the lower stack, or outgoing air received from the fuel cells in the upper stack and the fuel cells in the lower stack.

In one example, the heat exchanger assembly includes one or more conductive materials that conductively couple the fuel cells in the upper housing with the fuel cells in the lower housing. The heat exchanger assembly can be configured to receive one or more of the input fuel or the input air at a temperature at or below a designated temperature from outside of the heat exchanger assembly and to increase the temperature of the one or more of the input fuel or the input air above the designated temperature prior to directing the one or more of the input fuel or the input air into the fuel cells in one or more of the upper stack or the lower stack. The heat exchanger assembly can be configured to increase the temperature of the one or more of the input fuel or the input air above the designated temperature by transferring thermal energy from one or more of the outgoing fuel or the outgoing air received from the fuel cells in one or more of the upper stack or the lower stack to the one or more of the input fuel or the input air. The heat exchanger assembly can be configured to receive one or more of the outgoing fuel or the outgoing air at a temperature above a designated temperature from one or more of the upper housing or the lower housing and can be configured to decrease the temperature of the one or more of the outgoing fuel or the outgoing air to or below the designated temperature prior to directing the one or more of the outgoing fuel or the outgoing air out of the heat exchanger assembly.

In one example, the heat exchanger assembly is configured to decrease the temperature of the one or more of the outgoing fuel or the outgoing air to or below the designated temperature by transferring thermal energy from the one or more of the outgoing fuel or the outgoing air to one or more of the input fuel or the input air.

In one embodiment, a multi-stack fuel cell system includes one or more housings defining one or more interior chambers in which one or more stacks of fuel cells are disposed, and a heat exchanger assembly fluidly coupled with the one or more interior chambers of the one or more housings. The heat exchanger assembly is configured to receive one or more of input fuel or input air from outside of the one or more housings and to receive one or more of outgoing fuel or outgoing air from the fuel cells in the one or more housings. The heat exchanger assembly is configured to one or more of heat the one or more of the input fuel or the input air or to cool the one or more of the outgoing fuel or the outgoing air.

Optionally, the one or more housings include an upper housing and a lower housing, and the heat exchanger assembly can be disposed between the upper housing and the lower housing.

The heat exchanger assembly can separate the interior chamber of the upper housing from the interior chamber of the lower housing in one example. The heat exchanger assembly can conductively couple a first stack of the fuel cells in the upper housing with a second stack of the fuel cells in the lower housing.

The one or more housings may include an upper housing having a first stack of the fuel cells and a lower housing having a second stack of the fuel cells. The upper housing can be disposed above the lower housing such that weight of the upper housing and the first stack of fuel cells compresses the fuel cells in the second stack against each other.

In one example, the heat exchanger assembly is configured to transfer thermal energy from the one or more of the outgoing fuel or the outgoing air to the one or more of the input fuel or the input air to heat the one or more of the input fuel or the input air to a temperature in excess of a designated temperature. The heat exchanger assembly can be configured to transfer thermal energy to the one or more of the input fuel or the input air from the one or more of the outgoing fuel or the outgoing air to cool the one or more of the outgoing fuel or the outgoing air to a temperature in excess of a designated temperature.

Optionally, the heat exchanger assembly is configured to transfer heat from the one or more of the outgoing fuel or the outgoing air from the fuel cells to the one or more of the input fuel or the input air without mixing the one or more of the outgoing fuel or the outgoing air with the one or more of the input fuel or the input air.

In one embodiment, a method includes coupling a heat exchanger assembly with a lower housing having a lower stack of fuel cells disposed therein, and coupling an upper housing having an upper stack of fuel cells disposed therein with the heat exchanger assembly. The heat exchanger assembly is coupled with the lower and upper housing such that weight of the upper stack of the fuel cells in the upper housing compresses the fuel cells in the lower stack against each other.

Optionally, coupling the upper housing with the heat exchanger assembly includes disposing the heat exchanger assembly between the upper and lower housings. Coupling the heat exchanger assembly with the lower housing and coupling the upper housing with the heat exchanger assembly can include conductively coupling the fuel cells in the upper stack with the fuel cells in the lower stack through the heat exchanger assembly.

In one example, coupling the heat exchanger assembly with the lower housing and coupling the upper housing with the heat exchanger assembly includes fluidly coupling the heat exchanger assembly with interior chambers of the lower and upper housings in which the lower and upper stacks of the fuel cells are disposed.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
one or more housings defining one or more interior chambers in each of which one or more stacks of fuel cells are disposed, wherein the one or more stacks of fuel cells each comprise a plurality of fuel cells vertically stacked on top of each other along a vertical direction; and
a heat exchanger assembly fluidly coupled with the one or more interior chambers of the one or more housings, wherein the heat exchanger assembly is configured to receive input fuel through a first conduit or input air through a second conduit from outside of the one or more housings and to receive outgoing fuel through a third conduit or outgoing air through a fourth conduit from the fuel cells in the one or more housings,
wherein the first conduit comprising the input fuel is in thermal proximity with the third conduit comprising the outgoing fuel such that the input fuel is separately heated by the outgoing fuel and the second conduit comprising the input air is in thermal proximity with the fourth conduit comprising the outgoing air such that the input air is separately heated by the outgoing air, and
wherein the outgoing fuel or the outgoing air is not mixed with the input fuel or the input air.

2. The system of claim 1, wherein the one or more housings comprise an upper housing and a lower housing, and wherein the heat exchanger assembly is disposed between the upper housing and the lower housing.

3. The system of claim 2, wherein the heat exchanger assembly separates the interior chamber of the upper housing from the interior chamber of the lower housing.

4. The system of claim 2, wherein the heat exchanger assembly conductively couples a first stack of the fuel cells in the upper housing with a second stack of the fuel cells in the lower housing.

5. The system of claim 1, wherein the one or more housings comprise an upper housing having a first stack of the fuel cells and a lower housing having a second stack of the fuel cells, and wherein the upper housing is disposed above the lower housing such that weight of the upper housing and the first stack of the fuel cells compresses the fuel cells in the second stack against each other.

6. The system of claim 1, wherein the heat exchanger assembly is configured to transfer thermal energy from the outgoing fuel or the outgoing air to the input fuel or the input air to heat the input fuel or the input air to a temperature in excess of a designated temperature.

7. The system of claim 1, wherein the heat exchanger assembly is configured to transfer thermal energy to the of the input fuel or the input air from the outgoing fuel or the outgoing air to cool the outgoing fuel or the outgoing air to a temperature in excess of a designated temperature.

* * * * *